United States Patent
Heyworth et al.

(10) Patent No.: US 8,400,501 B2
(45) Date of Patent: Mar. 19, 2013

(54) INSPECTION ARRANGEMENT

(75) Inventors: Harold Heyworth, Loughborough (GB); Younas Ghulam, Nottingham (GB)

(73) Assignee: Rolls-Royce PLC, London (GB)

( * ) Notice: Subject to any disclaimer, the term of this patent is extended or adjusted under 35 U.S.C. 154(b) by 856 days.

(21) Appl. No.: 12/453,297

(22) Filed: May 6, 2009

(65) Prior Publication Data

US 2009/0278924 A1 Nov. 12, 2009

(30) Foreign Application Priority Data

May 12, 2008 (GB) .................................. 0808432.9

(51) Int. Cl.
*H04N 5/253* (2006.01)

(52) U.S. Cl. ........ 348/82; 348/83; 340/682; 340/539.26

(58) Field of Classification Search .................... 348/80, 348/83; 340/682; 240/539.26
See application file for complete search history.

(56) References Cited

U.S. PATENT DOCUMENTS

| 4,237,454 | A * | 12/1980 | Meyer ........................... 340/682 |
| 2004/0127298 | A1 * | 7/2004 | Marsden ........................... 472/1 |
| 2007/0129604 | A1 * | 6/2007 | Hatcher et al. ................ 600/136 |
| 2007/0139193 | A1 * | 6/2007 | Arik et al. ................. 340/539.26 |
| 2010/0220182 | A1 * | 9/2010 | Krull et al. ...................... 348/83 |

FOREIGN PATENT DOCUMENTS

| EP | 1 293 754 A1 | 3/2003 |
| WO | WO 2005/096571 A1 | 10/2005 |
| WO | WO 2006/086106 A3 | 8/2006 |

* cited by examiner

*Primary Examiner* — Tammy Nguyen
(74) *Attorney, Agent, or Firm* — Oliff & Berridge, PLC

(57) ABSTRACT

It is necessary to provide inspection arrangements in order to facilitate prototype design of assemblies such as gas turbine engines as well as insitu testing of such assemblies. Previously endoscope type arrangements have been utilized, but the flexible or rigid stems in such endoscopes can cause fouling and snagging in use. By providing an inspection arrangement in which the inspection element is combined with a positioning tool such that the inspection element can be detached from the positioning tool through a releasable element, it is possible to avoid such snagging problems. The inspection element will be relatively self-sufficient and incorporate possibly a camera or other sensor for temperature of otherwise. The inspection element will typically incorporate a wireless link arrangement, or possibly incorporate a storage device for data such that the inspection element can be retrieved later with that data.

20 Claims, 3 Drawing Sheets

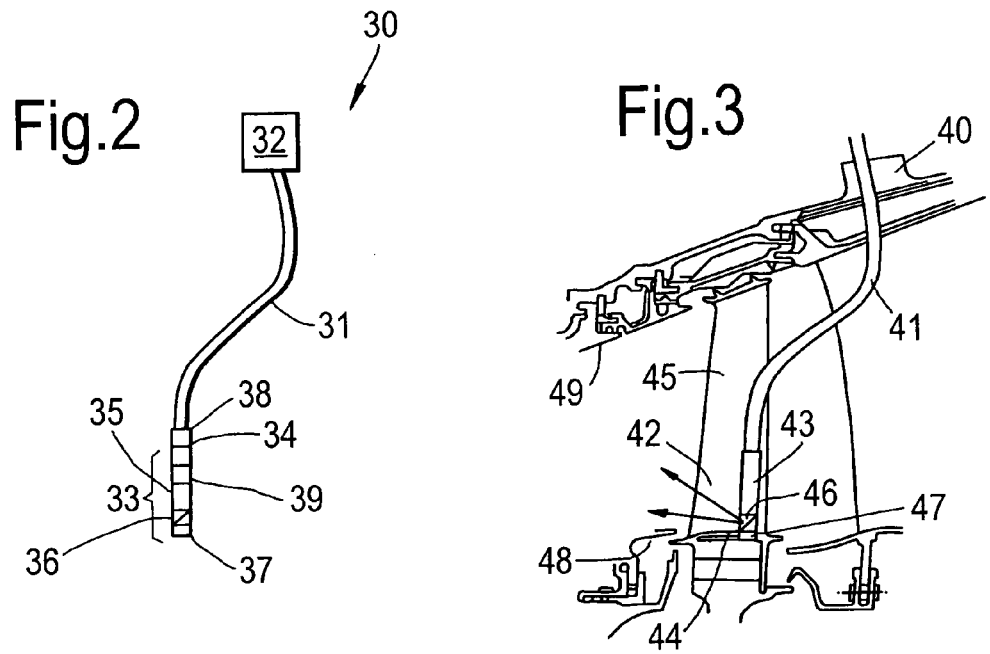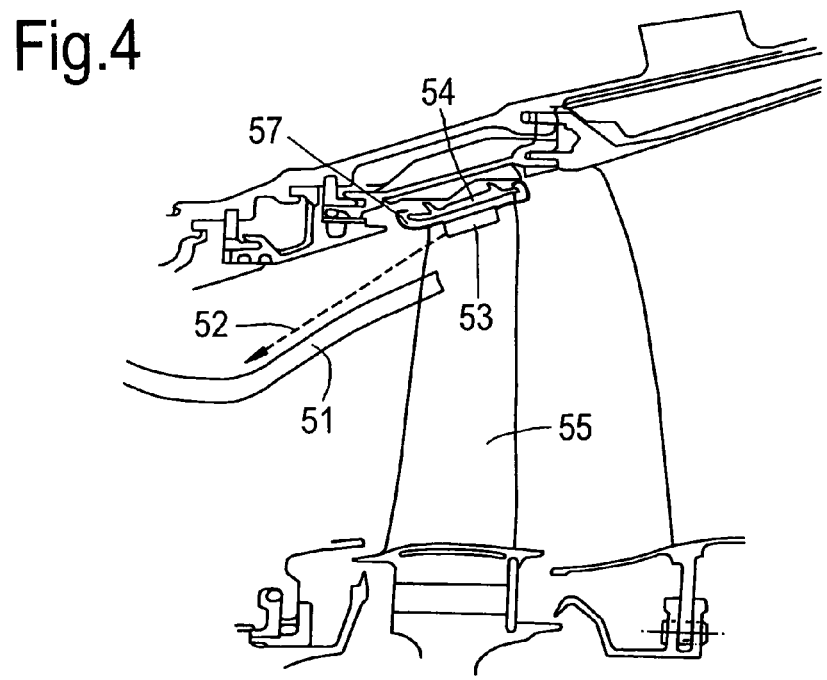

INSPECTION ARRANGEMENT

The present invention relates to inspection arrangements and more particularly to inspection arrangements utilising gas turbine engines in order to obtain a visual view of engine operation.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

In order to improve design as well as confirm performance it is advantageous to inspect parts of a gas turbine engine during operation. It is known to use such techniques as boroscoping which acts in a similar manner to an endoscope and so allows images to be obtained. Generally such inspection tools include a flexible or rigid shaft which is inserted into an engine or through a suitable access port. Observations are then made remotely either directly by looking down a scope into an inspection volume or indirectly by attaching a camera onto the exposed end of the endoscope and observing the image on a TV camera. It will also be understood alternatively a camera can be placed at the distal end of the scope and steered into a viewable position by appropriate manipulation of the associated flexible or rigid shaft in such circumstances acting as a positioning tool. It will also be understood that such areas may be dark or inappropriately lighted and in such circumstances a lighting element will also be provided at the distal or steerable end of the scope.

Unfortunately use of scopes has limitations in terms of their action. It will be understood that steering the distal end through which images are viewed either directly or indirectly requires manipulation of the scope. It is difficult to steer a scope with an overall length of action which is greater than approximately five meters. These difficulties are due to:

a) Steering of the scope is via a near point hand piece which will act conveniently over a large distance, such as two to five meters. The weight of the end manipulated becomes effectively greater and so handling becomes progressively more difficult;
b) There is a problem of fouling, trapping, catching or dragging of the scope sheath as it progresses to a desired observation point;
c) It will be understood that the sheath of the scope may fall into voids and in such circumstances the scope may become stuck;
d) Obstacles in the path to a desired observation point may require steering with relatively severe curvatures in the scope sheath which again can cause seizing of the probe in use;
e) Generally there are a limited number of access points into an engine and in such circumstances is quite common to need to have an abrupt change in direction of the scope in order to gain access to the desired observation point again creating severe difficulties with regard to jamming of the probe.

In view of the above it is generally difficult to place a scope with its distal end at a desired observation area. Furthermore even with highly skilled operators it can be difficult to avoid problems particularly as situations may occur that are highly stressful in terms of personal performance such as with regard to an onsite inspection of a failing engine. As indicated a particular problem is seizure of the scope within the engine which may require costly and time consuming dis-assembly of the engine to remove the inspection tool. These problems can be further exacerbated as the engine may be observed in operation and therefore will go through thermal and mechanical cycling leading to tolerance clearance changes along the path of the scope and so possible problems with respect to seizure being exacerbated.

In accordance with the present invention there is provided a method of inspecting a gas turbine engine comprising a rotor and a stationary component, the method of inspecting comprises the steps of (a) attaching an imaging device via a releasable fixture to the rotor via a positioning tool, (b) rotating the rotor so that the imaging device views the stationary component, (c) relaying images from the imaging device via a wireless link.

In accordance with another aspect of the present invention there is provided an inspection arrangement comprising an inspection element and a positioning tool for positioning the inspection element, the arrangement characterised in that the inspection element is secured to the positioning tool by a releasable element and includes a fixing to present the inspection element in use, the releasable element configured to allow the detachment of the inspection element in situ.

Generally, the inspection element comprises a camera. Typically, the inspection element includes a lighting element. Generally, the inspection element has a wireless link comprising a radio transmitter and/or radio receiver and/or transceiver. Possibly, the inspection element includes a temperature sensor. Possibly, the inspection element includes a PH or chemical element sensor.

Generally, the positioning tool comprises a flexible or rigid shaft.

Typically, the releasable element is configured to allow attachment of the inspection element by creating association with the releasable element greater than the fixing when required.

Possibly, the releasable element is detachable from the positioning tool to allow an attachment element to be secured to the positioning tool for the inspection element.

Generally, the fixing comprises a clip and/or adhesive and/or reciprocal element to a part to which the inspection element is to be secured and/or a magnetic association and/or a latch and/or an interference element.

Possibly, the inspection element is manipulatible to adjust its orientation.

Possibly, the inspection element includes an optical path adjustment mechanism. Possibly the optical path adjustment mechanism comprises mirrors and/or lenses and/or beam splitters. Generally, the mirrors and/or lenses and/or beam splitters are adjustable to vary the object area of the inspection element.

Generally, the positioning tool comprises concentric elements relatively displaceable to each other. Possibly, the concentric elements are displaceable circumferentially and/or longitudinally. Generally, displacement is to allow manipulation of a positioning tool and the attached inspection element. Possibly, displacement is to allow configuration of the releasable element to allow the detachment or attachment of the inspection element.

Possibly the inspection element has a storage element to store information obtained by the inspection element.

Embodiments of aspects of the present invention will now be described by way of example and with reference to the accompanying drawings in which:

FIG. 2 is a schematic illustration of an inspection arrangement in accordance with aspects of the present invention;

FIG. 3 is an illustration of positioning of an inspection arrangement in accordance with aspects of the present invention within a cross section of a gas turbine engine;

FIG. 4 is an illustration of securing an inspection element in accordance with the present invention within a part of a gas turbine engine; and, FIG. 5 illustrates positioning to two inspection elements in accordance with aspects of the present invention and particular areas of view for those inspection elements.

Figure 1:
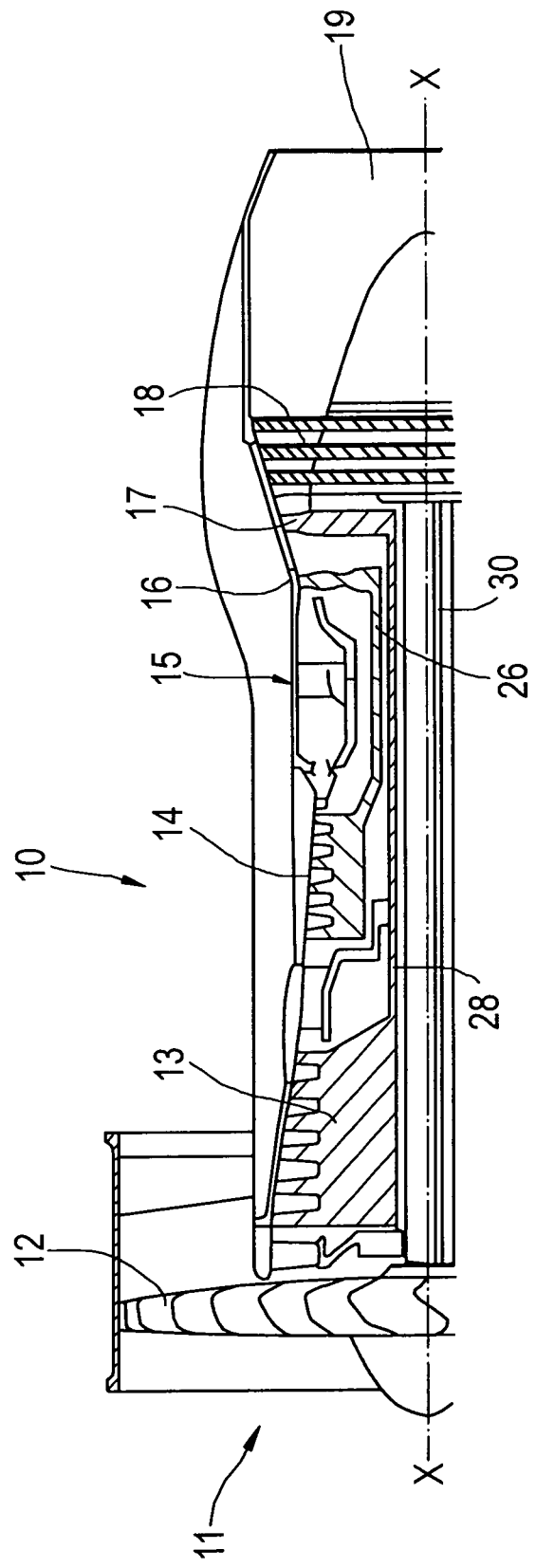
FIG. 1 is a schematic illustration of a gas turbine engine.

Aspects of the present invention relate to an inspection arrangement which generally comprises an inspection element and a positioning tool which are detachable from each other. Typically, the inspection element comprises a camera at a remote or distal end of the positioning tool which acts to locate as well as insert the inspection element. Generally, the inspection element has either a wireless link or an onboard data storage capability or other data transmission or storage device. In such circumstances the inspection tool can inspect a particular part or volume as required within an assembly.

In terms of operation initially the inspection element and the positioning tool are robustly connected together. This connection is through a releasable element which may comprise a permanent or electromagnetic coupling or releasable catch mechanism. Such association between the inspection element and the positioning tool allows manipulation of the positioning tool in order to place the inspection element appropriately.

The positioning tool with the inspection element attached is inserted through an appropriate access port in an assembly to be inspected such as a gas turbine engine. For example the areas to be expected may be a rotor and in such circumstances the access port will be chosen to be in close proximity to that rotor. The inspection element end of the inspection arrangement once located appropriately will be fixed to the rotor blade or adjacent to a rotor area using an appropriate fixing. The fixing may be an adhesive or clip or any other appropriate coupling such as reciprocal engagement between opposed parts or an interference fit or otherwise. It is important that the fixing mechanism is appropriate to the circumstances and will be sufficiently robust to retain the position of the inspection element in use. It will be appreciated that a number of fixing mechanisms may be utilised.

In accordance with aspects of the present invention care must be taken with regard to the strength of the bond presented by the releasable element in comparison with the means of fixing the inspection element locally in position. It will be understood to position the inspection element it is important that the fixing has a greater strength than the releasable element. Initially whilst the inspection element is secured to the positioning tool the releasable element will retain the inspection element to allow the appropriate manipulation through the positioning path to the inspection location. However, at that inspection location the releasable element must be able to release the inspection element to allow fixing and securing of the inspection element appropriately. Such alteration in the strength of the association between the releasable element of the positioning tool and the inspection element may be achieved through re-configuration of the positioning tool. A mechanism for such alteration will be described later.

Once in position it will be understood that the inspection element such as a camera will be robustly fixed by the fixing. In such circumstances the inspection element will be able to view or otherwise inspect an appropriate part to be viewed. With regard to a camera it will be understood that turning optics in the form of lenses or mirrors or beam splitters may be utilised in order to allow a side ways view to be taken.

As described above the inspection element when in use in accordance with the present invention is substantially independent of the positioning tool. Thus, with a camera it will be able to view a portion of a body to be inspected and either transmit through a wireless link images to a remote location or store data for retrieval later. Aspects of the present invention utilise mechanisms for data transmission which mainly include encryption, data compression and other techniques to achieve a desired level of resolution and accuracy with regard to viewed images.

As described above typically an inspection element in accordance with aspects of the present invention will comprise a camera. However, in order to achieve appropriate images it will also be understood that the inspection element will include an appropriate lighting element. The lighting element may produce white light or strobe light or light of a particular frequency such as infrared to enhance images if required.

It should also be understood that inspection elements in addition or as an alternative to a camera may include a temperature sensor or a PH or chemical sensor or other means of inspection of an area or volume.

Inspection elements may include means for determining whether the inspection element is operating correctly or particularly with regard to data storage whether the data storage capacity of the inspection element is about to be exceeded and therefore the inspection element should be retrieved.

It is envisaged in most circumstances that the inspection element will be utilised either during the initial design stages with regard to a gas turbine engine and also with regard to determining problems with performance or operation of a particular engine. In such circumstances the inspection element will remain insitu for a period of time. As the inspection element is detached from its positioning tool it will be understood that less consideration of the inspection element in terms of fouling with other parts of the assembly is required. Prior arrangements as indicated typically comprised a positioning tool in the form of a flexible or rigid shaft. In such circumstances the flexible or rigid shaft would remain in place during operation of the assembly. With regard to gas turbine engines it will be understood that there may be thermal as well as other mechanical cycling which may cause fouling of the positioning element. Aspects of the present invention as indicated above separate the inspection element from the positioning tool. Thus, the positioning tool will be removed whilst the inspection is performed. Problems with regard to thermal or mechanical cycling closing access path tolerances and closures will therefore be removed. In such circumstances the inspection element can be placed within the assembly in a cold state and retrieved similarly in a cold state or when a temperature sensor associated with the inspection element determines the arrangement is at an appropriate temperature for such removal. It may be appreciated that an alternative may be to place the inspection element whilst the assembly is hot to potentially open access paths. Such heating may be as indicated through operation of the assembly such as a gas turbine engine or warming the engine in an oven to an appropriate temperature.

As indicated above whilst the inspection element is in place it will be understood that the positioning tool will then be decoupled from the inspection element through an appropriate release mechanism of the releasable element. The release mechanism as indicated may be with regard to a magnetic or a mechanical link. Generally, the positioning tool can be completely withdrawn or removed to a safe position to avoid fouling and seizing in use.

The inspection element will typically have a wireless link. The wireless link may be to a completely remote receiver or through a receiver in the positioning tool. Signals from the inspection element, whether that be a camera or other form of sensor, will be transmitted to the receiver and interpreted appropriately.

The inspection element may be secured directly to a rotor or other element. In such circumstances turning of the rotor will alter the orientation of the inspection element such as a camera. As there are no physical connections between the inspection element and the positioning tool it will be understood that the rotor can be turned as many times as required and as fast or slowly as required to perform an inspection. Furthermore, as indicated lighting whether that be strobe or continuous will be intrically associated with the inspection element and so generally constant throughout the inspection procedure.

As the inspection element will be relatively fixed it will be understood that the observational area of the inspection element can be adjusted as required. Thus, in addition to the inspection element being positioned by the positioning tool for particular viewed areas it will also be possible once positioned that the viewed areas may be changed by appropriate reconfiguration of the inspection element either physically or by electronic means with regard to use of mirrors or beam splitters or lenses to change the area of inspection.

Typically it is advantageous to remove the positioning element to allow operation of an assembly such as a gas turbine engine with the inspection element in situ. Alternatively, the positioning element may be retained at least partially inserted within the assembly to allow a closer spatial relationship between the inspection element and the positioning element for wireless connection pick up in a potentially hostile environment.

With regard to removal of the positioning element it is understood that generally the process is the reverse of the positioning procedure for the positioning tool. In such circumstance the positioning tool will again be brought into a situation where the releasable element will engage the inspection element robustly to allow that inspection element to be re-attached through simple pulling against the fixing to cause detachment from its location for inspection. In such circumstances again the releasable element will be re-configured so that the association of the releasable element with the inspection element is greater than the associated through the fixing of the inspection element at its inspection location.

FIG. 2 provides a schematic illustration of an inspection arrangement 30 in accordance with aspects to the present invention. The arrangement 30 comprises a positioning tool 31 having controller elements 32 at one end and an inspection element 33 at another end. The positioning tool 31 as illustrated can be twisted and bent to allow manoeuvring through a positioning path within an assembly such as a gas turbine engine.

The controller elements 32 generally incorporate appropriate external controls for release, as indicated through a release element 34, of the inspection element 33 in use. It will also be understood that the controller elements 32 may incorporate a radio transmitter to relay images to a base station or a remote location for appropriate viewing or processing.

The inspection element 33 in accordance with aspects of the present invention comprises a number of features. Firstly, an inspection sensor 35 typically in the form of a camera will be provided. However, as indicated above, alternatively or additionally temperature sensors or PH or chemical sensors could be provided in addition to or as an alternative to a camera. The inspection element 33 in the embodiment depicted includes angled mirrors or beam splitters or lenses 36 to enable the viewed area of the camera to be adjusted. It will be understood that an appropriate fixing mechanism shown schematically as element 37 will be associated with the inspection element 33. The fixing element 37 may comprise clips or adhesives or other mechanisms such magnetism to allow association of the inspection element with or about an appropriate part to be viewed or sensed.

Generally, the positioning tool 31 as indicated above has a principal function of simply positioning the inspection element 33. Additionally, as illustrated in the embodiment depicted in FIG. 2 a distal end of a flexible or rigid stem of the positioning tool 31 may include a radio receiver or transceiver 38 to allow more local communication with a transmitter or a transceiver 39 of the inspection element 33.

FIG. 2 provides a schematic illustration of a first embodiment of aspects of the present invention. Thus as described above generally the positioning tool 31 has the function of simply positioning the inspection element 33 whilst the inspection element 33 itself is substantially detachable from the positioning tool and in such circumstances can operate independently. This independence relates to enabling fixing of the inspection element as well as by providing either local data storage or transmission of such data with regard to images to an appropriate remote location. It will also be understood that the controller end 32 may itself incorporate a data storage element if required.

As indicated above generally the positioning tool 31 with the associated inspection element 33 will be manipulated into position through an appropriate access point in an assembly such as a gas turbine engine. FIG. 3 provides an illustration of such location. Thus, a positioning tool 41 is presented through an access port 40 and manipulated appropriately to position an inspection element 43. The inspection element 43 incorporates an image determining element 46 to allow images in the direction of arrow heads 42 to be seen. The inspection element 43 incorporates a fixing 47 to allow the inspection element 43 to be secured to a blade platform 44 associated with a rotor blade 45. The blade 45 is rotated in order to change the orientation and positioning to the inspection element 43 appropriately to alter the view particularly with regard to static elements 48, 49.

In FIG. 3 it will be noted that the inspection element 43 incorporates the fixing 47 at a head end and in such circumstances uses the view determining element 46 in order to achieve side ways views as required. It will be understood that typical fixings will include a spring hook or other interference which is pushed into a root gap between platforms 44. The spring retention of the fixing in such circumstances can be released by a pulling action upon the positioning tool when recovery of the inspection element 43 is required.

As indicated above, careful consideration of the relative strengths of association of the fixing when positioning the inspection element and when removing that inspection element must be considered. Generally when fixing initially the positioning tool should have a sufficient location and assembly with the inspection element to allow accurate positioning and to allow forced engagement of the fixing. However to achieve detachment the strength of association of the fixing for the inspection element must be less than an appropriate release mechanism or element of the positioning tool with the inspection element. Such reconfiguration of the positioning tool may be achieved in a number of ways as described later. It is important that the fixing to the platform or otherwise is stronger than the association with the positioning tool to allow detachment. One approach to ensuring robust positioning of the inspection element is depicted in FIG. 4. Thus, an inspection element 53 is located about a blade shroud 54 utilising a clip 57 of an appropriate fixed length. It will be noted that the clip 57 has hook ends which are engaging round the blade shroud 54 in order to achieve robust location. The inspection element 53 will be located through a positioning tool 51 which generally gains access through an appropriate port or otherwise. Generally, the inspection element 53 will have a view in the direction of arrow heads 52.

As the inspection element 53 is located upon a blade rotor 55 it will be understood that the rotor 55 may rotate about its axis and therefore change the view as seen in the direction of arrowheads 52 appropriately. As the inspection element 53 is essentially independent and not coupled to a positioning device it will be understood that the rotor 55 can rotate as many times as possible to alter the view as seen by inspection element 53.

The inspection element 53 depicted in FIG. 4 is attached with a significant axial orientation. In such circumstances the clip 57 will generally secure the inspection element 53 through spring hooks at each end. The spring hooks may be caught around the front end of the blade outer platform shroud and extend to the rear where a similar hook engages that end of the platform. Generally as indicated above in a preferred embodiment the inspection element 53 will incorporate a camera. The camera will create images which are transmitted by wireless coupling or the inspection element 53 may incorporate an appropriate data storage mechanism. The view is in the direction of arrowheads 52 and is generally axial so it may not be necessary to provide a beam splitter or otherwise in order to allow sideways views.

Once the inspection element in accordance with aspects of the invention is in position it will be understood that such positioning must be robust. Thus, the inspection element 53 is stable so it may then be possible to adjust the view electronically through utilisation of beam splitters or mirrors or lenses. Furthermore adjustment of the viewed area may be through mechanical actuators within the inspection element 53 which may alter the positioning and direction of sensing elements such as cameras. The inspection element 53 either through rotation of a mounting upon which it is secured or through other adjustments may vary the area inspected. As there are no physical connections between the inspection element 53 and the positioning tool 51 in use it will be understood that consideration with regard to fouling by that positioning tool can be avoided. The inspection element 53 in such circumstances can be manipulated relative to the surface upon which it is secured and surfaces can move as fastly or slowly as required depend upon the strength of the fixing provided.

As indicated above generally the inspection element will also incorporate lighting if necessary for a camera integrally associated with the camera.

Figure 5:
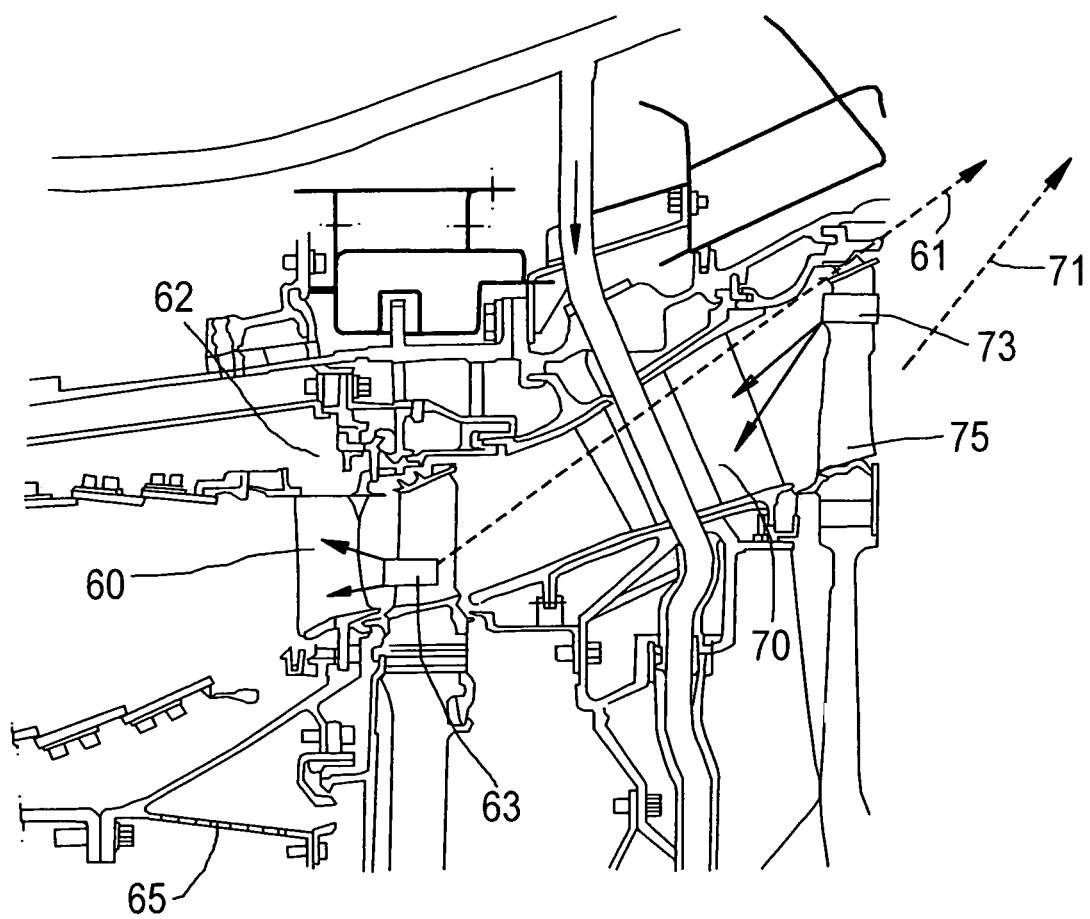

FIG. 5 provides an illustration with regard to positioning of inspection elements in accordance with aspects of the present invention within a gas turbine engine. Thus, a first inspection element 63 is located upon a rotor 65 to give views in the direction of arrowheads 62 towards a high pressure nozzle guide vane 60. A second inspection element 73 is positioned upon a rotor 75 and is arranged to have a new direction illustrated by arrowheads 72 towards an intermediate nozzle guide vane 70. Positioning of the inspection elements 63, 73 will be through an appropriate positioning tool (not shown) and access paths. Once in position it will be understood that the respective elements 63, 73 will be able to provide data capture either through wireless or radio communication links 61, 71 or by each element 63, 73 storing data as recorded. FIG. 5 provides indications as to typical position for inspection elements 63, 73 in accordance with aspects of the present invention. It will be noted that these positions are upon rotors 65, 75. Turning of the rotors 65, 75 will allow inspection of different static parts within the engine. Rotation of the inspection element overcomes any difficulties highlighted above with regard to gaining access to different positions away from convenient access. It will be understood that generally access by the positioning tool can be more direct or with limited curvature positioning movements by the tool. The inspection element can be associated with the rotor through relatively straight or simple broad curvature movements of the positioning tool. Once the inspection element is appropriately secured to the rotor that rotor can be turned to provide access to other areas and in particular regions of static elements which could not be conveniently inspected with a traditional inspection arrangement comprising a camera or otherwise on the end of a rigid or flexible endoscope or boroscope. For recovery of the inspection element it is understood that the rotor will simply return to the most convenient access path so that the positioning tool can pass along that straight path or with only a limited bending to gain access for retrieval of the inspection element.

As indicated above there may be circumstances in which due to the small volume available the inspection element cannot incorporate a sufficiently large battery to have a large transmission distance particularly in the view of the high rotational speeds of such assemblies as gas turbine engines. Thus, the positioning tool with an appropriate transceiver or simple receiver can be partially withdrawn but only sufficiently to avoid any fouling or seizing within the assembly. This partially withdrawn position will reduce the transmission range of the inspection element needed to allow the receiver in the positioning tool to be utilised appropriately for picking up of images and other data signals.

Generally, as indicated above the positioning tool in accordance with aspects to the present invention will incorporate a releasable element to allow positioning and then release of the inspection element as required. The releasable element will also allow reattachment of the inspection element for removal. In such circumstances it is possible that a potentially sophisticated releasable element will be required to allow such variations in the capability with regards to the attachment and withdrawal. Such reconfiguration of the releasable element may be through appropriate mechanisms within the positioning tool. For example, the positioning tool may comprise concentric sheaths which can be rotated relative or otherwise displaced such as laterally or longitudinally to each other in order to create at the distal end upon which the releasable element is secured changes in that element. For example, for robust association of the inspection element with the positioning tool whilst being positioned there may be a latch of other physical association to prevent release of the inspection element. Alternatively, an electromagnetic or other mechanism may be utilised in order to retain through the releasable element association between the inspection element and the positioning tool. Once the inspection element is located and its fixing secured appropriately the releasable element can then be reconfigured such that the association between the inspection element and the positioning tool is removed. In such circumstances the mechanical latch would be displaced or the electromagnetic association released such that a separation occurs. It should be understood that several mechanisms and processors including mechanical latches, magnetic and suction element may be utilised separately or together in order to provide the variation in the strength of association between the inspection element and the positioning tool through the releasable element.

In order to retrieve the inspection element it will be understood that the positioning tool would then simply perform the reverse of the deployment process, that is to say the releasable element brought into association with the inspection element and the robust bond re-established. This robust bond would be sufficient to overcome the fixing for the inspection element with the part to be inspected. The releasable element would re-establish a mechanical latch or re-employ an electro magnetic association. An alternative with regard to retrieval of the inspection element would be to provide the releasable element as detachable from the positioning element. In such circumstances the releasable element would be removed from the positioning tool and a retrieval releasable element attached to the positioning tool. The retrieval releasable element would then be brought into association with the inspection element and a bond established sufficient to overcome the fixing with the part upon which the inspection element is secured.

Aspects of the present invention separate the inspection element and the positioning tool in order to provide greater functionality with respect to inspection arrangements in situations where positioning and fouling though seizure could create problems. Furthermore, by taking advantage of movable items such as rotors within a gas turbine engine, views of parts of an assembly which would not otherwise be available can be achieved. It will be understood that the inspection element when associated with a rotor can be turned to view positions which would not be available using a previous fixed combination of inspection camera on a fixed flexible or rigid stem. By enabling removal of the positioning element it will be understood issues concerning snagging and trapping are avoided. Generally, the inspection element can be located in stable conditions avoiding thermal cycling processes which may causing snagging and seizing.

Aspects of the present invention relate to use of an inspection element as indicated above. The inspection element may include a camera and in such circumstances optical processes including mirrors lenses or beam splitters may be utilised in order to allow the steering of the image seen by the inspection element. Adhesives and/or spring clips and/or hair pins or otherwise may be utilise with regard to the fixing. The fixing in such circumstances will be designed to ensure that the inspection element remains in place but also to enable that fixing to be overcome when removal of the inspection element is required. Alternatively, if the inspection element is sacrificial the inspection element may remain in place.

In particular with regard to an inspection element which includes a camera to provide images it will be understood that lighting is important. In such circumstances an incandescent source in a lens portion of the camera may provide appropriate illumination.

With regard to gas turbine engines it will be understood that the inspection element in the form of a camera will be mounted upon the rotor blades as described above in order to view nozzle guide vane locations. It will also be understood that inspection elements including a camera may be utilised with regard to watching operational clearances for internal and external parts particularly during ground running and flight scenarios. Thus, mechanical gaps and tolerances can be determined. Aspects of the present invention have particular applicability with regard to inspecting during design stages and in order to identify movements and clearances in such areas as thrust reverses and common nozzles. It will also be understood that accreditation with regard to ice forming and shedding can be monitored.

Aspects of the present invention provided an inspection arrangement in which problems with regard to inspection location can be reduced in comparison with previous arrangements. The inspection element can be placed in an appropriate situation and remain in operation with the positioning tool withdrawn at least partially. By separation of the inspection element and the positioning tool as indicated above problems with regard to snagging and seizure can be avoided. Aspects of the present invention as indicated are applicable to assemblies such as gas turbine engines, but may also be utilised in other situations such as tunnel boring, gear boxes, sealed machinery and rolling machinery. It will also be understood that the present invention can be utilised in a range of test rig environments where the risk of loss of the inspection element, and in particular a camera, is not considered of great concern.

The present invention also lends itself to a method of inspecting components of a gas turbine engine. In particular, because of the complex architecture of gas turbine engines it is difficult and time consuming to inspect a non-rotatable annular engine component, such as an array of stator vanes. Here, the method of inspecting comprises the steps of (a) attaching an imaging device via a releasable fixture to the rotor via a positioning tool, (b) rotating the rotor so that the imaging device views the stationary component and (c) relaying images from the imaging device via a wireless link to a display unit or a recording device. The imaging device is usually a camera, but other devices such as infra-red and ultrasonic equipment may also be used. Other details of the method of inspection will be apparent from the description of the inspection arrangement described herein. One important advantage of the method and arrangement of the present invention is the ability to freely rotate the inspection device around the annulus of the engine in a single consecutive routine. This greatly helps the inspection process because prior art devices must be deployed at various discrete points around the engine or only part of the circumference is inspected before changing the insertion point or direction (clockwise or anticlockwise) of inspection. In the prior art devices and methods some vanes etc can be missed. Furthermore, wired inspection device can foul in the engine and pull on the device causing it to be misaligned. This can all result in poor inspection and even the wrong vane or blade being removed and replaced.

Modifications and alterations to aspects of the present invention will be appreciated by those skilled in the technology. Thus, the inspection arrangement allows flexibility with regard to the inspection element. Each inspection element will be relatively independent and may be particularly specified for a particular function. In such circumstances a camera, along with other sensors for temperature or chemical reagents within a gas flow can be combined appropriately for different parts of an inspection scenario. The inspection elements can be made of an appropriate size and can be positioned by a positioning tool which requires less consideration with regard to in use robust positioning of the inspection element and therefore may be sized and proportioned so that there is less likelihood of snagging and seizing in use.

We claim:

1. A method of inspecting a gas turbine engine comprising a rotor and a stationary component, the method of inspecting comprises the steps of
    (a) attaching an inspection element via a releasable fixture to the rotor via a positioning tool,
    (b) rotating the rotor so that the inspection element views the stationary component,
    (c) relaying images from an imaging device via a wireless link.

2. An arrangement as claimed in claim 1 wherein the inspection element has a storage element to store information obtained by the inspection element.

3. An inspection arrangement comprising an inspection element and a positioning tool for positioning the inspection element, wherein the inspection element is secured to the positioning tool by a releasable element and includes a fixing to present the inspection element in use, the releasable element configured to allow the detachment of the inspection element in situ.

4. An arrangement as claimed in claim 3 wherein the inspection element comprises a camera.

5. An arrangement as claimed in claim 3 wherein the inspection element includes a lighting element.

6. An arrangement as claimed in claim 3 wherein the inspection element has a wireless link comprising a radio transmitter and/or radio receiver and/or transceiver.

7. An arrangement as claimed in claim 3 wherein the inspection element includes a temperature sensor.

8. An arrangement as claimed in claim 3 wherein the inspection element includes a PH or chemical element sensor.

9. An arrangement as claimed in claim 3 wherein the positioning tool comprises a flexible or rigid shaft.

10. An arrangement as claimed in claim 3 wherein the releasable element is configured to allow attachment of the inspection element by creating association with the releasable element greater than the fixing when required.

11. An arrangement as claimed in claim 3 wherein the releasable element is detachable from the positioning tool to allow an attachment element to be secured to the positioning tool for the inspection element.

12. An arrangement as claimed in claim 3 wherein the fixing comprises a clip and/or adhesive and/or reciprocal element to a part to which the inspection element is to be secured and/or a magnetic association and/or a latch and/or an interference element.

13. An arrangement as claimed in claim 3 wherein the inspection element is manipulatable to adjust its orientation.

14. An arrangement as claimed in claim 3 wherein the inspection element includes an optical path adjustment mechanism.

15. An arrangement as claimed in claim 14 wherein the optical path adjustment mechanism comprises mirrors and/or lenses and/or beam splitters.

16. An arrangement as claimed in claim 14 wherein the mirrors and/or lenses and/or beam splitters are adjustable to vary the object area of the inspection element.

17. An arrangement as claimed in claim 3 wherein the positioning tool comprises concentric elements relatively displaceable to each other.

18. An arrangement as claimed in claim 17 wherein the concentric elements are displaceable circumferentially and/or longitudinally.

19. An arrangement as claimed in claim 18 wherein displacement is to allow manipulation of a positioning tool and the attached inspection element.

20. An arrangement as claimed in claim 18 wherein displacement is to allow configuration of the releasable element to allow the detachment or attachment of the inspection element.

* * * * *